No. 862,559. PATENTED AUG. 6, 1907.
A. S. HOWELL.
PICTURE EXHIBITING MACHINE.
APPLICATION FILED SEPT. 14, 1906.
2 SHEETS—SHEET 1.
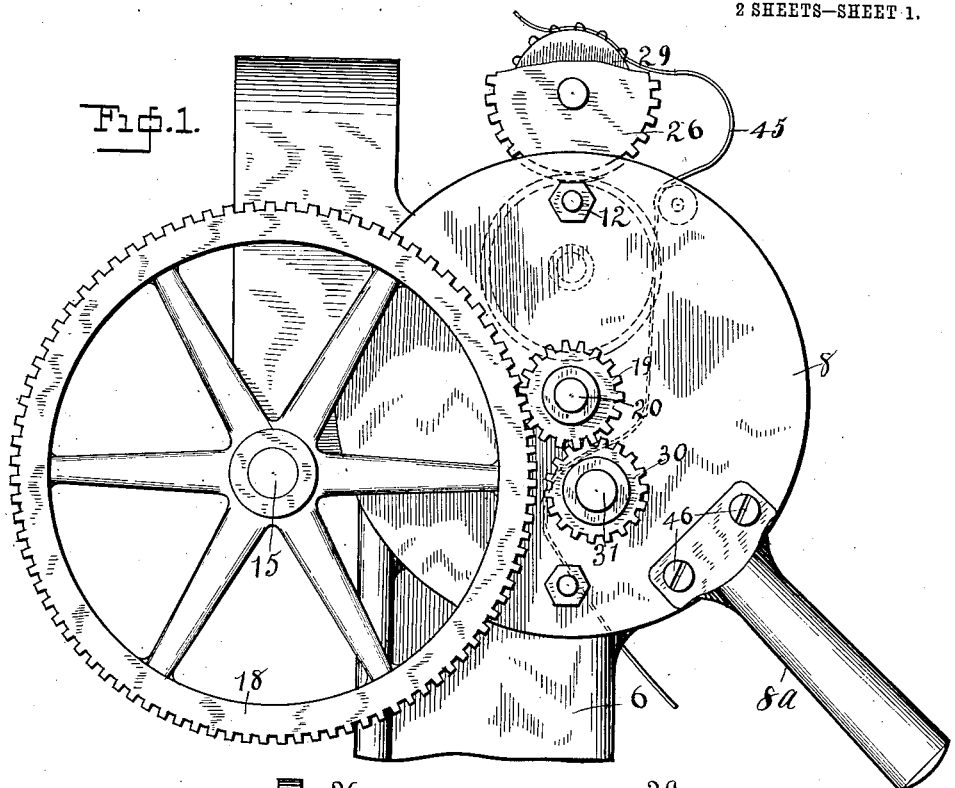
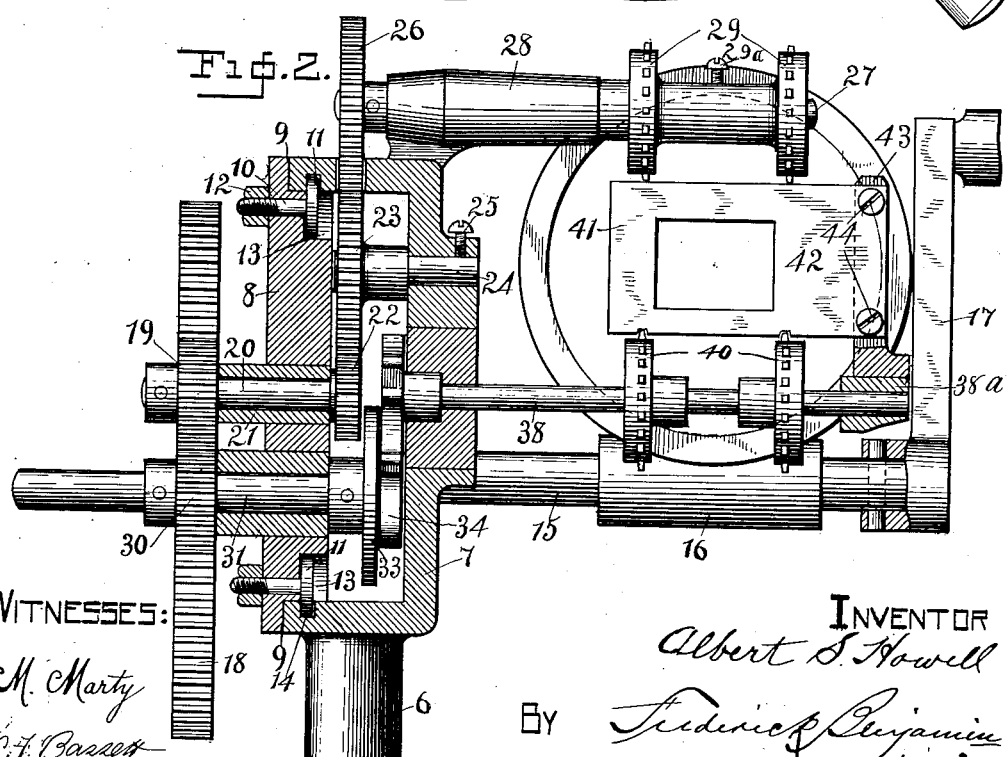
WITNESSES:
M. Marty
C. F. Bassett
INVENTOR
Albert S. Howell
BY Frederick Benjamin
ATT'Y.

No. 862,559. PATENTED AUG. 6, 1907.
A. S. HOWELL.
PICTURE EXHIBITING MACHINE.
APPLICATION FILED SEPT. 14, 1906.
2 SHEETS—SHEET 2.
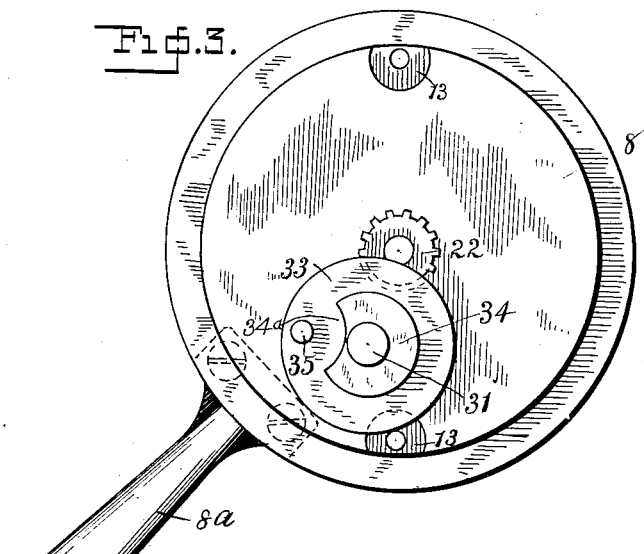
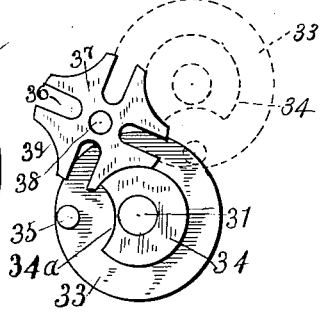
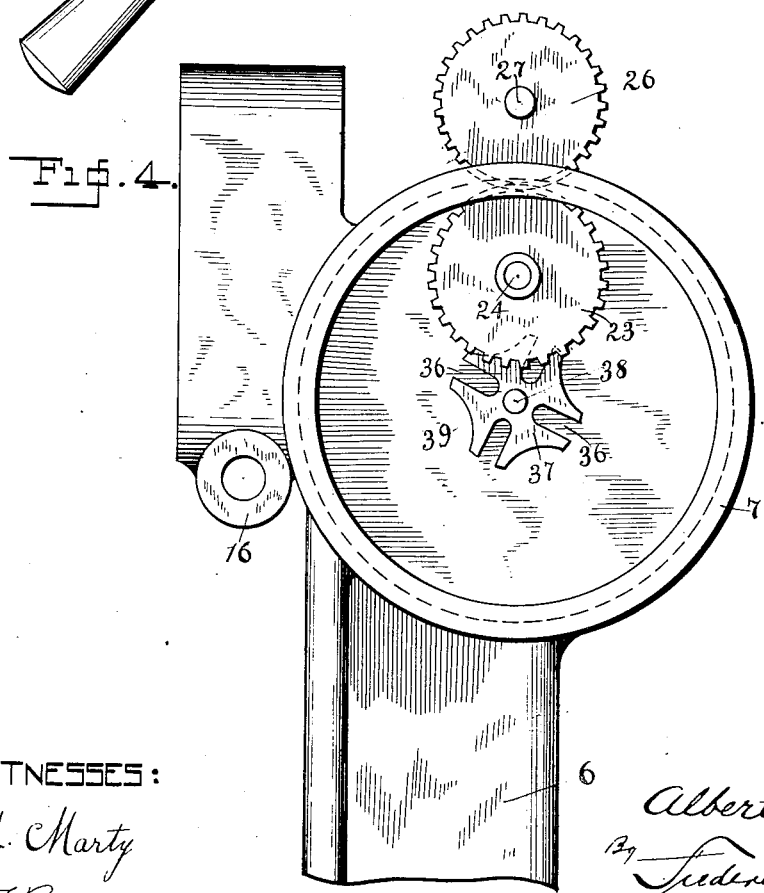
Witnesses:
M. Marty
C. F. Bassett
Inventor
Albert S. Howell
By Frederick Benjamin
Atty.

UNITED STATES PATENT OFFICE.

ALBERT S. HOWELL, OF CHICAGO, ILLINOIS, ASSIGNOR TO DONALD J. BELL, OF CHICAGO, ILLINOIS.

PICTURE-EXHIBITING MACHINE.

No. 862,559.  Specification of Letters Patent.  Patented Aug. 6, 1907.

Application filed September 14, 1906. Serial No. 334,583.

*To all whom it may concern:*

Be it known that I, ALBERT S. HOWELL, a citizen of the United States, residing at Chicago, in the county of Cook and State of Illinois, have invented certain new and useful Improvements in Picture-Exhibiting Machines, of which the following is a specification.

My invention relates to apparatus for exhibiting moving pictures and has special reference to that form of mechanism adapted to manipulate a continuous or elongated strip or film upon which a series of pictures has been previously photographed or otherwise impressed.

The principal objects of my invention are to provide means for producing an accurate registration between the frame opening and the picture represented upon the film; to furnish means for rapidly and accurately regulating said registration; to provide means for converting a continuous and uniform motion of the film feeding mechanism into a regular intermittent motion;
to furnish means for preventing undue stretching or puckering of the moving film; to secure greater effectiveness and smoother movements in the operating mechanism; to compensate for unavoidable variations in the spacing of the film perforations and to simplify and otherwise improve the design and mechanical arrangement of the various parts.

It is well known to those skilled in the art that one very serious difficulty heretofore met with in the proper presentation of moving pictures is the common tendency of the film to stretch or shrink for various reasons so as to cause decided variations in the spaces between the perforations as well as to alter the plane of the film by wrinkles and waves with the result that when the film operating mechanism is non-adjustable, or if adjustable is inadequately so, there will be a tendency to interfere with the accuracy of registration, and unless these two features, the frame opening and the picture spacing are properly coördinated the projection of the picture or series of pictures will be rendered unsatisfactory. In order to overcome these prevalent defects and disadvantages, and to accomplish the before mentioned objects, I have designed an improved method of controlling the registration, and otherwise regulating the film movement which consists in general of a planetary gear transmission controlled by a manually operated and frictionally retained disk with attached lever or handle designed and adapted to vary the linear interval between the film tensioning and guiding device and the film transmitting sprocket, the details of construction being fully illustrated in the accompanying drawings which form a part of this specification and in which:—

Figure 1 is a side elevation of my improved picture exhibiting machine with a portion of the frame and part of the gearing broken away; Fig. 2 is a front elevation, partly in section, with the film removed; Fig. 3 is a view of the inner face of the gear supporting disk with attachments; Fig. 4 is a side elevation with the disk and main gear wheel removed; Fig. 5 is a fragmentary view of the intermittent gear movements.

Referring to the drawings, the numeral 6 designates the base of the machine which carries a casing 7, circular in form and inclosing a portion of the transmitting gears. One side 8, of said casing has the form of a disk which is removable and provided with a peripheral groove, or rabbet 9, which engages the circular margin of the casing 7. The disk 8 is held in position and in frictional contact with the said circular margin by two bolts 10 which have broad flattened heads 11 and are provided and held in place by nuts 12. The said bolts are situated diametrically opposite and pass through countersunk holes 13, which are sufficiently near the margin of said disk to permit the edge of the heads 11 to project enough to engage an annular groove 14 which is formed in the inner surface of the casing. This arrangement is such that when the nut 12 is tightened the projecting edge of the bolt head 11 will engage the margin of the groove 14 and will tend to draw the disk 8 against the outer margin of the circular casing thus causing more or less frictional pressure between the surfaces in contact at 9. When the bolts 10 are properly adjusted the said disk 8 can be rotated by means of the handle 8ª in either direction and this movement can be instantly made while the mechanism is moving at any rate of speed. The main shaft 15 turns in a journal 16 and is provided with an operating crank at one end while on the other is mounted a driving gear 18 which meshes with a pinion 19 carried upon the outer end of a shaft 20 journaled in a box 21 secured to the disk 8, the center of the shaft being concentric with that of the disk. The inner end of the shaft 20 carries a pinion 22 which meshes with a larger gear 23 journaled on a stud 24 secured in the casing 7 by means of a set-screw 25. The gear 23 imparts motion to a similar gear 26 pinned to one end of a shaft 27 which turns in a sleeved journal 28. Upon the other end the shaft 27 carries a spool or double sprocket 29 fixed by a set screw 29ª and furnished with teeth for engagement with the perforations as ordinarily produced in the margins of the film. Meshing with the said pinion 19 and receiving motion therefrom is a spur gear 30 secured to a shaft 31 which is journaled in a bearing 32 secured in the disk 8. Upon the inner end of said shaft is pinned a blank wheel 33 to the face of which is secured a circular locking plate 34 one portion of the margin being cut away to form a concave clearance 34ª. Near the margin of said wheel 33, and radially opposite the clearance 34ª is a fixed, cylindrical lug or pin 35 which is adapted to engage radial grooves 36 in a delay gear 37 during the rotation of said blank wheel 33. The delay gear 37 is mounted upon the inner end of a shaft 38 which pierces the casing 7 and at its outer end is journaled in a box 38ᵃ supported by the main frame. The delay gear is provided with four of the said radial grooves 36 arranged at regular intervals of 90 degrees. On the periphery of the wheel between said grooves are formed concave surfaces 39 having the same radius of curvature as the periphery of the locking plate 34 with which they engage during the movements of the train of gearing just described which constitutes a modified form of what is known in the art as a Geneva movement. Upon the shaft 38 are mounted duplicate sprocket wheels 40 which are in alinement with the double sprocket 29 hereinbefore described. A frame 41 having a framing opening 42 is secured to a fixed arm 43 by means of screws 44.

It will be readily understood that when the driving gear 18 is given a regular motion by any application of power to its shaft, as for instance by turning the crank 17, the upper sprocket 29 receives a regular and continuous movement having a constant relation to the rate of motion of the driving gear and that the transmitted speed will be greater than that of the main shaft. The lower sprocket however, will have an intermittent motion imparted thereto through the medium of the delay gear and dependent mechanism, as the shaft to which the delay gear is attached and which carries the lower twin sprockets 40 will revolve only a quarter turn to each revolution of the blank wheel 33 by the engagement of the pin 35 with said gear. Since the upper sprocket feeds continuously and the lower intermittently, when the lower sprocket pauses the upper ones will continue to force the film 45 onward so that there will be a redundancy of the film at this point during the rest period. In order to take care of this excess in the feed the lower sprocket is geared at a much higher rate of speed than the upper and it must be just sufficient to establish a proper equilibrium between the two sprocket movements. This result can be only approximately attained by a fixed ratio in the gearing because of the prevalence of inequalities in the film and other irregularities hereinbefore mentioned, and it is the function of the revoluble disk 8 carrying the epicycloidal gear 3 to equalize the feed movements or compensate for irregularities or faulty construction. When the disk 8 is rotated clockwise by operating its handles it will carry the pinion 30 circumferentially about the center of motion, which, as hereinbefore stated, is the axis of the shaft 38 the action of the locking plate 34, or the pin 35 if it is in engagement with its slots, will be to slightly rotate the sprocket carrying shaft 38 in a retrograde manner thus correspondingly diminishing the tension upon the film. Conversely operating the handle against the clock movement will cause a corresponding forward movement of the lower sprocket and produce an increased film tension with the result of altering the registration of the film relative to the frame opening. The mechanism as designed and illustrated will permit a disk movement through an arc approximating 90 degrees and although the variations between the positions of the feed sprocket made thereby are comparatively minute, this travel has been found sufficient for the purpose desired.

It is obvious that many changes may be made in the devices of my invention as herein disclosed without departing from the spirit and scope thereof and I do not wish, therefore, to be limited to the precise construction herein set forth.

Having thus described my invention what I claim is:—

1. An apparatus for the purpose specified adapted to operate a picture bearing film including a frame having a light transmitting aperture, means for continuously feeding said film, means for intermittently retarding the movement of a portion of said film, and a revoluble disk carrying an epicyclic gear train for varying the position of the film relatively to the frame aperture.

2. An apparatus for the purpose specified adapted to operate a picture bearing film including a frame having a light transmitting aperture, means for continuously feeding said film, means for intermittently stopping the movement of a portion of said film relatively to the frame opening, an adjustable epicyclic gear for varying the registration of the film pictures with the frame aperture, and a plurality of adjustable bolts adapted to frictionally retain said gear in adjusted position the said gear in adjusted position.

3. An apparatus for the purpose specified adapted to operate a picture bearing film including a frame having a light transmitting aperture, means for intermittently stopping the movement of a portion of said film, a revoluble disk carrying an epicyclic gear train for the purpose of controlling the registration of the film pictures with the frame aperture, and means for retaining the said disk and gear train in position.

4. An apparatus for the purpose specified adapted to operate a picture bearing film including a frame having a light transmitting aperture, means for intermittently stopping the movement of a portion of said film, a revoluble disk carrying an epicyclic gear train for the purpose of controlling the registration of the film pictures with the frame aperture, means for varying the angular positions of said disk and frictional means for retaining the said disk and gear train in adjusted position.

5. An apparatus for the purpose specified adapted to operate a picture bearing film including a frame having a light transmitting aperture, means for stopping the movement of a portion of said film in relation to said light transmitting aperture at regular intervals of time, a revoluble disk carrying an epicyclic gear train for the purpose of controlling the registration of the film pictures with the frame aperture, a handle attached to the disk for the purpose of varying the angular position of said disk to adjust the relative positions of the elements of said gear train and frictional means for retaining the disk and attachments in adjusted position.

In testimony whereof I affix my signature in presence of two witnesses.

ALBERT S. HOWELL.

Witnesses:
F. BENJAMIN,
M. A. MILORD.